No. 755,378.

Patented March 22, 1904.

UNITED STATES PATENT OFFICE.

WALTER MILLS, OF LONDON, ENGLAND, ASSIGNOR TO A. O. GRANGER, OF CARTERSVILLE, GEORGIA.

METHOD OF MAKING NITRIC ACID.

SPECIFICATION forming part of Letters Patent No. 755,378, dated March 22, 1904

Application filed May 25, 1902. Renewed February 24, 1904. Serial No. 195,110. (No specimens.)

*To all whom it may concern:*

Be it known that I, WALTER MILLS, a subject of the King of Great Britain, residing in London, England, have invented certain new and useful Improvements in the Manufacture of Nitric Acid, of which the following is a specification.

This invention relates to a method or process of preparing nitric acid from salts or compounds naturally occurring or otherwise and containing the acid by first converting the nitrate into nitrate of lead and is based upon the discovery that lead not only in its metallic condition, but as it exists in its ores (especially galena and cerusite) is attacked and dissolved by hydrofluosilicic acid when that acid is sufficiently concentrated, and particularly when the concentrated acid is heated.

In carrying out the present process of manufacturing nitric acid I place excess of scrap lead or crushed ore in a pan or other receptacle, and having added thereto a proper amount of acid heat is applied until the mass is substantially dry. I find in practice that the warm acid begins to attack and dissolve the substance when the specific gravity of the acid is about 1.80, and in the event that scrap lead is employed the action of the acid is somewhat accelerated by blowing air through the mixture. If warm water is now added to the dried mass, an aqueous solution of silicofluorid of lead is obtained, which after being filtered is ready for use. The next step in the practice of the present process consists in the preparation of an aqueous solution of nitrate of lead from the solution of silicofluorid. This is usually accomplished in practice by adding thereto the nitrates of the elements calcium, potassium, or sodium either in aqueous solution or in a fine state of division. The silicofluorid of the respective metal is precipitated, while nitrate of lead remains in solution. From this solution of nitrate of lead nitric acid may be formed by adding sulfuric acid, the reaction taking place as indicated by the equation $$Pb(NO_3)_2 + H_2SO_4 = 2HNO_3 + PbSO_4.$$

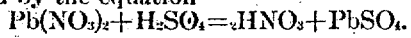

The strength of the nitric acid thus produced depends upon the specific gravity of the liquids employed. The sulfate of lead produced as a result of the reaction is precipitated. The solution of nitric acid may be drained therefrom and afterward concentrated by evaporation, which is found to be a satisfactory means of obtaining the concentrated acid, especially when the evaporation is conducted *in vacuo.* Sulfate of lead being slightly soluble in concentrated nitric acid, the solutions employed should not be too strong. It is advantageous also to keep the sulfuric acid in excess when mixing the fluids and to have that acid in slight excess at the close of the operation. Practically all the sulfate of lead can thus be removed from aqueous nitric acid of a specific gravity of about 1.2.

Having described my invention, I claim—

1. The process of manufacturing nitric acid which consists in dissolving lead-carrying substances in hydrofluosilicic acid; in then reacting upon the silicofluorid of lead with a salt of nitric acid; and in then separating the nitric acid from the nitrate of lead formed.

2. The process of manufacturing nitric acid which consists in dissolving lead-carrying substances in hydrofluosilicic acid having a specific gravity of about 1.80; in then reacting upon a solution of the silicofluorid of lead so formed to form nitrate of lead; and in then separating the nitric acid from the nitrate of lead.

3. The process of manufacturing nitric acid which consists in heating a mixture of a lead-carrying substance and concentrated hydrofluosilicic acid; in then reacting upon a solution of the silicofluorid of lead so formed to form nitrate of lead; and in then separating the nitric acid from the nitrate of lead.

Signed at Nos. 9 to 15 Murray street, New York, N. Y., this 23d day of May, 1903.

WALTER MILLS.

Witnesses:
FRED. J. DOLE,
JOHN O. SEIFERT.